United States Patent [19]
Nagai

[11] Patent Number: 5,463,851
[45] Date of Patent: Nov. 7, 1995

[54] VERTICAL-TYPE FILLING AND PACKAGING MACHINE

[75] Inventor: Katsumi Nagai, Gunma, Japan

[73] Assignee: Orihiro Co., Ltd., Tomioka, Japan

[21] Appl. No.: 272,396

[22] Filed: Jul. 20, 1994

[30] Foreign Application Priority Data

Dec. 20, 1993 [JP] Japan .................. 5-319708

[51] Int. Cl.⁶ ................. B65B 9/08; B65B 51/30; B65B 51/14; B05B 51/33
[52] U.S. Cl. ............. 53/552; 53/374.8; 53/375.3
[58] Field of Search .............. 53/451, 551, 552, 53/373.6, 374.9, 375.3, 374.8

[56] References Cited

U.S. PATENT DOCUMENTS

| | | | |
|---|---|---|---|
| 3,050,916 | 8/1962 | Gausman et al. | 53/552 |
| 3,256,673 | 6/1966 | Tew et al. | 53/551 |
| 3,332,204 | 7/1967 | Frank | 53/551 X |
| 3,611,657 | 10/1971 | Inoue et al. | 53/551 X |
| 3,738,080 | 6/1973 | Reil | 53/551 |
| 4,506,494 | 3/1985 | Shimoyama et al. | 53/551 |
| 4,563,862 | 1/1986 | McElvy | 53/552 |
| 4,630,429 | 12/1986 | Christine | 53/551 X |
| 4,656,818 | 4/1987 | Shimoyama et al. | 53/551 |
| 4,662,978 | 5/1987 | Oki | 53/551 X |
| 5,054,270 | 10/1991 | McMahon | 53/552 |

*Primary Examiner*—Horace M. Culver
*Attorney, Agent, or Firm*—Oblon, Spivak, McClelland, Maier & Neustadt

[57] ABSTRACT

A vertical-type filling and packaging machine for filling and packaging a filling material in a tubular film of resin has a pair of squeezing rollers rotatably disposed one on each side of the tubular film filled with a filling material. The squeezing rollers press against the tubular film to clamp and feed the tubular film downwardly and create an unfilled region in the tubular film. A heat sealing mechanism which is disposed downwardly of the squeezing rollers for heat-sealing and severing the unfilled region has a heater bar for heat-sealing the unfilled region and a cooling bar for cooling the portion which has been heat-sealed by the heater bar. The heater bar and the cooling bar are successively pressable against a portion of the unfilled region while the tubular film is being held at rest. A cutting device, which may be an independent cutting blade or a triangular protrusion on the heater bar, severs the heat-sealed portion, thereby producing a sacked product. A plurality of film support members are disposed downwardly of the heat-sealing mechanism for gripping and holding a lower end of the unfilled region from the time the unfilled region is heat-sealed until the unfilled region is severed by the heat sealing mechanism.

19 Claims, 16 Drawing Sheets

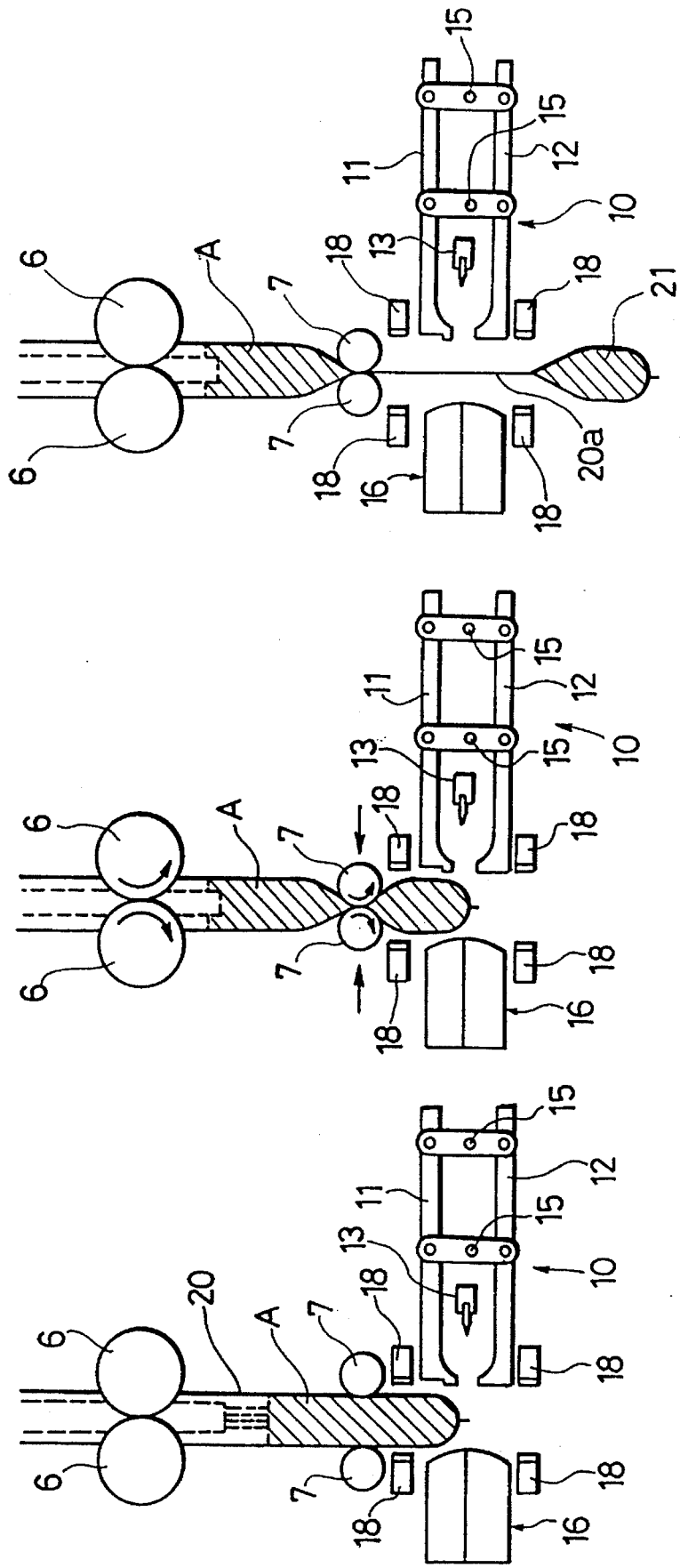

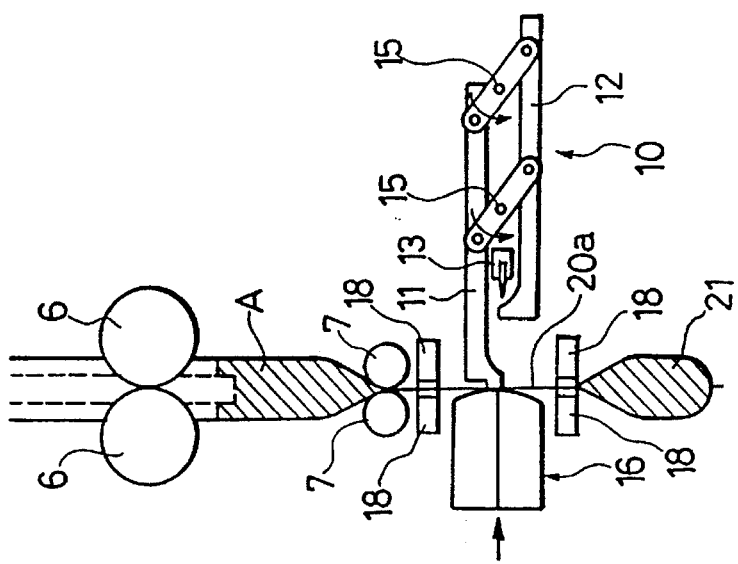
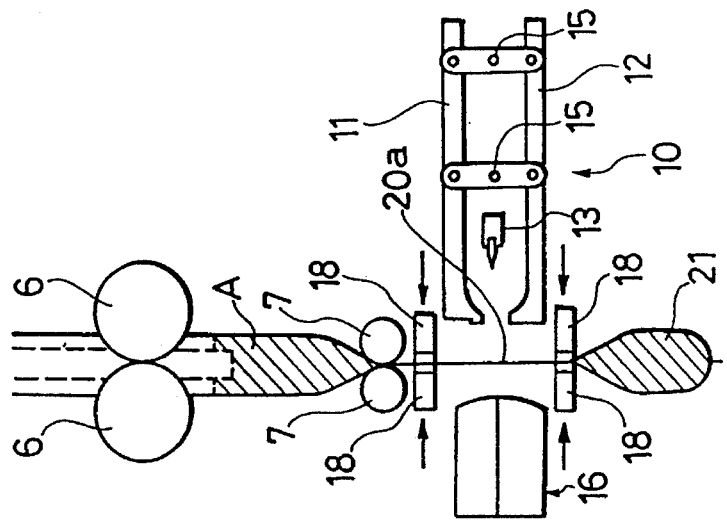

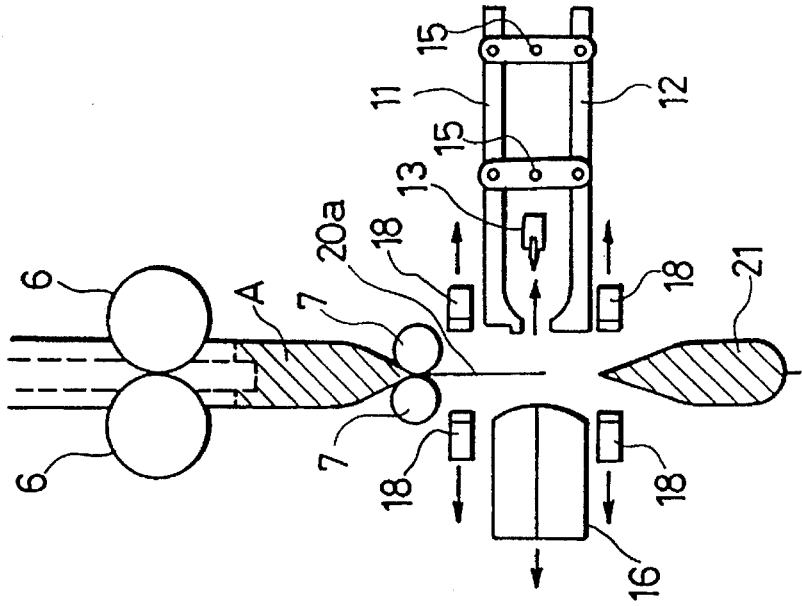
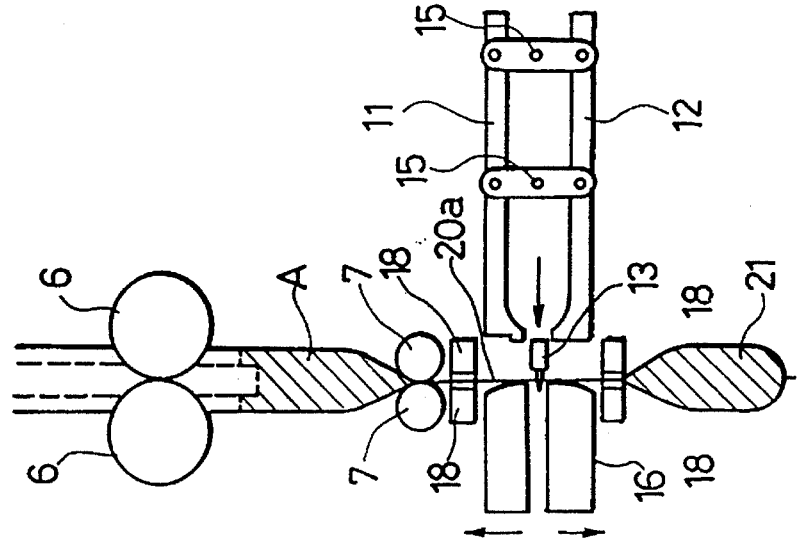
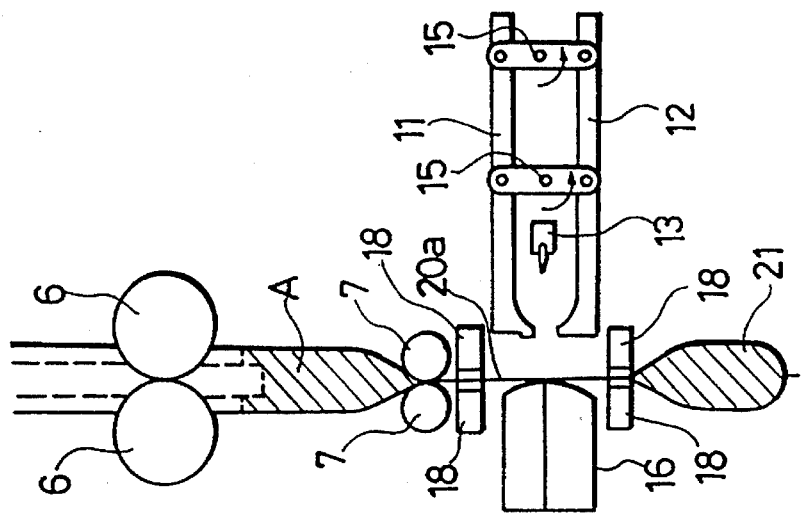

5,463,851

VERTICAL-TYPE FILLING AND PACKAGING MACHINE

BACKGROUND OF THE INVENTION

1. Field of the Invention

The present invention relates to a vertical-type filling and packaging machine for filling a tubular film of synthetic resin with a liquid, semi-liquid, or paste-like filling material and heat-sealing the filled tubular film to thereby form a sacked or flexible packaged product.

2. Description of the Related Art

One conventional vertical-type filling and packaging machine for filling a tubular film of synthetic resin with a liquid, semi,liquid, or paste-like filling material and heat-sealing the filled tubular film to thereby form a sacked or flexible packaged product is shown in FIGS. 1 and 2 of the accompanying drawings. FIG. 1 is a schematic side elevation of the vertical-type filling and packaging machine, and FIG. 2 is a front elevation of the vertical-type filling and packaging machine shown in FIG. 1.

As shown in FIGS. 1 and 2, the vertical-type filling and packaging machine has a charging nozzle 1101 vertically disposed in a charging pipe 1102 for charging a filling material A into a flexible package or sack. The charging pipe 1102 is surrounded by an annular sack forming guide 1103 for forming a sheet film 1120' into a tubular film 1120. The tubular film 1120 which is formed by the sack forming guide 1103 is sealed to join its longitudinal mating edges by a vertical sealer 1104 positioned beneath the sack forming guide 1103.

Below the charging pipe 1102, there are disposed a pair of film feed rollers 1106 in the form of disk-shaped rollers for clamping and feeding the tubular film 1120 downwardly. A pair of squeezing rollers 1107 in the form of cylindrical rollers are disposed below the film feed rollers 1106. The squeezing rollers 1107 are rotatable in synchronism with the film feed rollers 1106 for clamping the tubular film 1120 to divide the charged filling material A into vertically spaced masses in the tubular film 1120. The squeezing rollers 1107 are horizontally movable toward and away from each other perpendicularly to the vertical direction in which the tubular film 1120 is fed downwardly.

A heat sealing device 1108 for horizontally heat-sealing the tubular film 1120 is located downwardly of the squeezing rollers 1107. The heat sealing device 1108 has a pair of horizontally spaced heater bars 1108a each housing a heater (not shown). The heater bars 1108a are horizontally movable toward and away from each other perpendicularly to the vertical direction in which the tubular film 1120 is fed. When the heater bars 1108a that have been moved toward each other are pressed against the tubular film 1120 and heated, the tubular film 1120 is heat-sealed thereby.

A cutting device 1109 is disposed underneath the heat-sealing device 1108 for cooling and cutting off a heat-sealed portion of the tubular film 1120. As shown in FIG. 3 of the accompanying drawings, the cutting device 1109 comprises a pair of blocks 1110a, 1110b disposed in horizontally confronting relationship to each other and movable toward and away from each other in the horizontal directions indicated by the arrows B perpendicularly to the vertical direction in which the tubular film 1120 is fed. The blocks 1110a, 1110b have respective recesses 1115 defined in confronting surfaces thereof in horizontal alignment with each other. One of the blocks 1110a has a coolant passage 1116 defined therein for passing a coolant therethrough to cool the block 1110a. The recess 1115 in the block 1110a houses therein a cutting blade 1111 that is normally retracted in the recess 1115, but can be moved into and out of the recess 115 in the horizontal directions indicated by the arrows B.

A spreader guide 1105 composed of a pair of downwardly spreading pins is mounted on the lower end of the charging pipe 1102.

The tubular film 1120 which is continuously shaped from the sheet film 1120' by the sack forming guide 1103 and the vertical sealer 1104 is fed downwardly by the film feed rollers 1106 rotated by a motor (not shown). At this time, the tubular film 1120 is kept open by the spreader guide 1105. The filling material A is charged into the tubular film 1120 when the film feed rollers 1106 are stopped, and the squeezing rollers 1107, the heat sealing device 1108, and the cutting device 1109 are opened, i.e., spaced from the tubular film 1120. After the filling material A has been charged into the tubular film 1120, the squeezing rollers 1107 are moved into a pressing relationship to the tubular film 1120, thereby diving the charged filling material A into two vertically spaced masses in the tubular film 1120. Thereafter, the squeezing rollers 1107 are rotated in the directions indicated by the arrows in synchronism with the film feed rollers 1106. The tubular film 1120 is now fed downwardly, with an unfilled region 1120a formed in the tubular film 1120 by the squeezing rollers 1107.

When the tubular film 1120 is delivered to the position shown in FIGS. 1 and 2, the squeezing rollers 1107 are deactivated, and the heat sealing device 1108 is closed, i.e., displaced into contact with the unfilled region 1120a of the tubular film 1120. Then, the heat sealing device 1108 is energized to press and heat-seal the unfilled region 1120a. After the unfilled region 1120a has been heat-sealed, the tubular film 1120 is fed downwardly again. When the heat-sealed portion of the tubular film 1120 is positioned in the cutting device 1109, the cutting device 1109 is closed, i.e., displaced into contact with the heat-sealed portion of the tubular film 1120. The cutting device 1109 is pressed against the heat-sealed portion to hold and cool the heat-sealed portion. Then, the cutting blade 1111 is moved out of the recess 1115 in the block 1110a, thereby cutting off the heat-sealed portion of the tubular film 1120.

Another conventional vertical-type filling and packaging machine has a sealing mechanism in which a cutting device similar to the cutting device 1109 is incorporated in a heat sealing device similar to the heat sealing device 1108.

However, the conventional vertical-type filling and packaging machine suffer from the following drawbacks:

(1) After the unfilled region of the tubular film has been heat-sealed and until it is held and pressed by the cutting device, the heat-sealed portion is subject to the weight of the filling material beneath the heat-sealed portion. Since the heat-sealed portion is not completely cooled after the unfilled region of the tubular film has been heat-sealed until it is held and pressed by the cutting device, the heat-sealed portion will be unduly stretched unless the film is of high mechanical strength. Therefore, when a tubular film is to be filled with a heavy material, the tubular film should not be a single-layer film or a thin multilayer film, but should be a laminated film which, as shown in FIG. 4 of the accompanying drawings, comprises an easily heat-fusible film 1126 as of polyethylene for achieving a desired seal strength and a not easily heat-fusible film 1125 as of nylon for achieving a desired mechanical strength, the not easily heat-fusible film 1125 being applied to an outer surface of the easily heat-fusible film 1126.

(2) The easily heat-fusible film and the not easily heat-fusible film are heat-fusible at different temperatures due to different manufacturing processes and conditions. After being heat-sealed, the easily heat-fusible film and the not easily heat-fusible film tend to peel away from each other. Therefore, there are certain limitations as to the selection of film materials and laminating conditions.

(3) Inasmuch as the heat-sealed portion is cut after it is fed to the cutting device, it may be cut at a displaced position owing to a variation in the distance by which the tubular film is fed when moving the heat-sealed portion from the heat sealing device to the cutting device. In view of the range of such displaced positions where the heat-sealed portion may be cut, it is necessary to produce a heat-sealed portion having a large width or vertical extent. However, an increase in the width of the heat-sealed portion results in an increased consumption of the tubular film, which in turn increases the cost of sacked products. In the other conventional vertical-type filling and packaging machine in which the cutting device is incorporated in the heat sealing device, the heat-sealed portion is cut at a desired position because the tubular film is heat-sealed and cut at the same position. However, since a region of the tubular film where the cutting blade passes is not pressed and heat-sealed, the heat-sealed portion is required to have a width increased by an amount corresponding to the region which is not pressed to maintain a desired heat seal strength.

(4) Each of the confronting surfaces of the respective heater bars has an array of horizontal ridges for preventing the heat-sealed film layers from peeling away from each other before the heat-sealed portion reaches the cutting device. When the heat sealing device is pressed against the tubular film, the horizontal ridges bite into the tubular film, causing the film layers to mesh with each other, thereby keeping the heat-sealed film layers bonded to each other while they are being solidified. As shown in FIG. 5 of the accompanying drawings, however, separate or non-bonded regions 1121a are created between bonded regions 1121b of the film layers. Since any filling material which is left in the non-bonded regions 1121a tends to foam with the heat of the heater bars, the film layers in the bonded regions 1121b may peel away from each other. Furthermore, if the tubular film is cut at any one of the non-bonded regions 1121a, the filling material which is left in the cut-off non-bonded region 1121a will be exposed, and will leak and rot, giving off an undesirable odor which is detrimental to the value of the sacked products.

(5) Inasmuch as the horizontal ridges of the heater bars are positioned so as to mesh with each other when the heat sealing device is pressed against the tubular film, the tubular film is liable to be severed by the edges of intermeshing horizontal ridges. When such a film severance occurs, the filling and packaging machine is often caused to shut off for a prolonged period of time.

SUMMARY OF THE INVENTION

It is therefore an object of the present invention to provide a vertical-type filling and packaging machine which is capable of heat-sealing, cooling, and cutting a tubular film without moving the tubular film, and of heat-sealing the tubular film at a desired region of reduced width in its entirety irrespective of the type of the tubular film.

To accomplish the above object, there is provided in accordance with the present invention a vertical-type filling and packaging machine comprising a pair of squeezing rollers rotatably disposed one on each side of a tubular film of resin filled with a filling material for clamping and feeding the tubular film downwardly to create an unfilled region in the tubular film; a heat sealing mechanism disposed downwardly of said squeezing rollers for heating-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion; and film support members disposed downwardly of said heat sealing mechanism for gripping and holding a lower end of said unfilled region from the time the unfilled region is heat-sealed until it is severed by said heat sealing mechanism.

The vertical-type filling and packaging machine may also have other film support members disposed upwardly of said heat sealing mechanism for gripping and holding an upper end of said unfilled region from the time the unfilled region is heat-sealed until it is severed by said heat sealing mechanism.

The filling material may comprise a fluid material.

The heat sealing mechanism may comprise a pair of parallel joint links pivotally supported at respective central portions thereof, said heater bar being angularly movably mounted on respective ends of said joint links, and said cooling bar being angularly movably mounted on respective opposite ends of said joint links.

The cutting means may comprise a cutting blade disposed between said heater bar and said cooling bar for movement toward said heat-sealed portion, or a triangular protrusion disposed on a pressing surface of said heater bar which is to be pressed against said unfilled region.

The heater bar and said cutting means may be disposed one on each side of said unfilled region for movement toward and away from the unfilled region, said cooling bar comprising two members movable vertically away from each other upon movement of said heater bar toward said unfilled region, for allowing said heater bar to project from between said two members, said heat sealing mechanism further comprising two heater bar receivers disposed in a confronting relationship to said heater bar across said unfilled region and movable vertically away from each other upon movement of said cutting means toward said unfilled region for allowing said cutting means to project from between said two heater bar receivers. The cutting means may comprise a cutting blade movable toward and away from said unfilled region, or a triangular protrusion disposed on a pressing surface of said heater bar which is to be pressed against said unfilled region, said heat sealing mechanism further comprising a bearing member against which said heater bar can be pressed.

When an unfilled region is created in a tubular film filled with a filling material by the squeezing rollers, the feeding of the tubular film is stopped, and the lower end of the unfilled region is gripped by the film support members. Thereafter, a portion of the unfilled region is successively heat-sealed and cooled by the heater bar and the cooling bar, and then the heat-sealed portion is severed by the cutting means. After the heat-sealed portion is severed by the cutting means, the unfilled region is released from the film support members, thus producing a sacked product.

Until the process of heat-sealing, cooling, and severing the unfilled region is finished, the lower end of the unfilled region is supported by the film support members. Therefore, the heat-sealed portion is not subject to the weight of the filling material beneath the heat-sealed portion, and consequently, the tubular film is not unduly stretched. Since the unfilled region is heat-sealed, cooled, and severed in one position while being supported, the tubular film can be severed at a constant position, and the film layers in the heat-sealed portion will peel away from each other. As the film layers in the heat-sealed portion do not peel away from each other, it is not necessary for the pressing surface of the heater bar to have horizontal ridges, and the tubular film can be heat-sealed in its entirety in the heat-sealed portion. Because the tubular film can be severed at a constant position and heat-sealed in its entirety in the heat-sealed portion, the heat-sealed portion may be reduced in width or vertical extent.

In the case where the heater bar has a triangular protrusion on its pressing surface, the unfilled region can be heat-sealed and severed simultaneously by the heater bar. Such a modification is effective in simplifying the process of heat-sealing, cooling, and severing the tubular film. The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 9(a) through (i) are schematic side elevations illustrating a successive operation process of the vertical-type filling and packaging machine shown in FIG. 6;

DETAILED DESCRIPTION OF THE PREFERRED EMBODIMENTS

Figure 6:
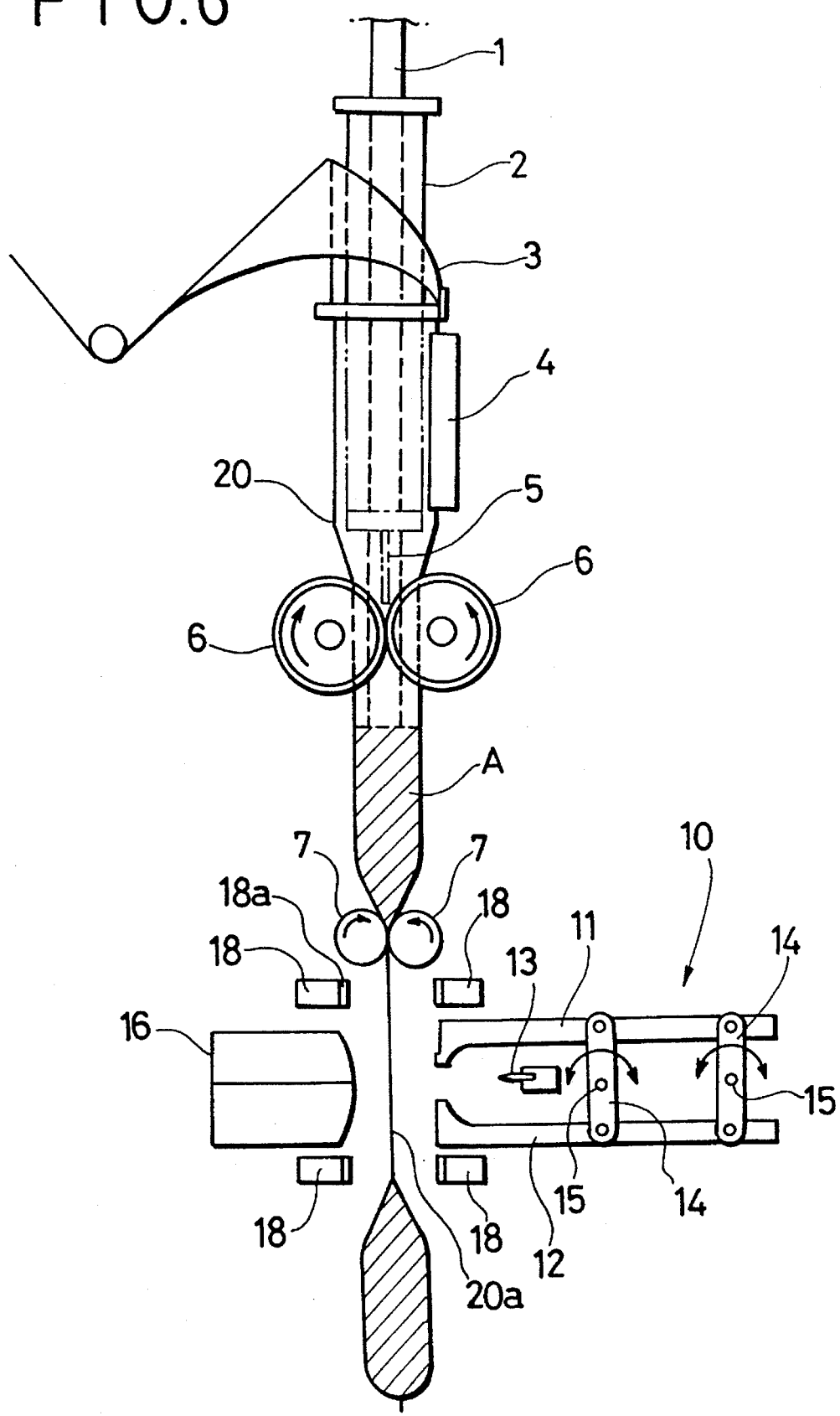
FIG. 6 is a schematic side elevation of a vertical-type filling and packaging machine according to a first embodiment of the present invention.

FIG. 6 shows a vertical-type filling and packaging machine according to a first embodiment of the present invention. The vertical-type filling and packaging machine shown in FIG. 6 serves to charge a filling material A charged from a charging nozzle 1 into a tubular film 20 formed by an annular sack forming guide 3, and heat-seal and cut off the tubular film 20 filled with the filling material A.

Figure 1:
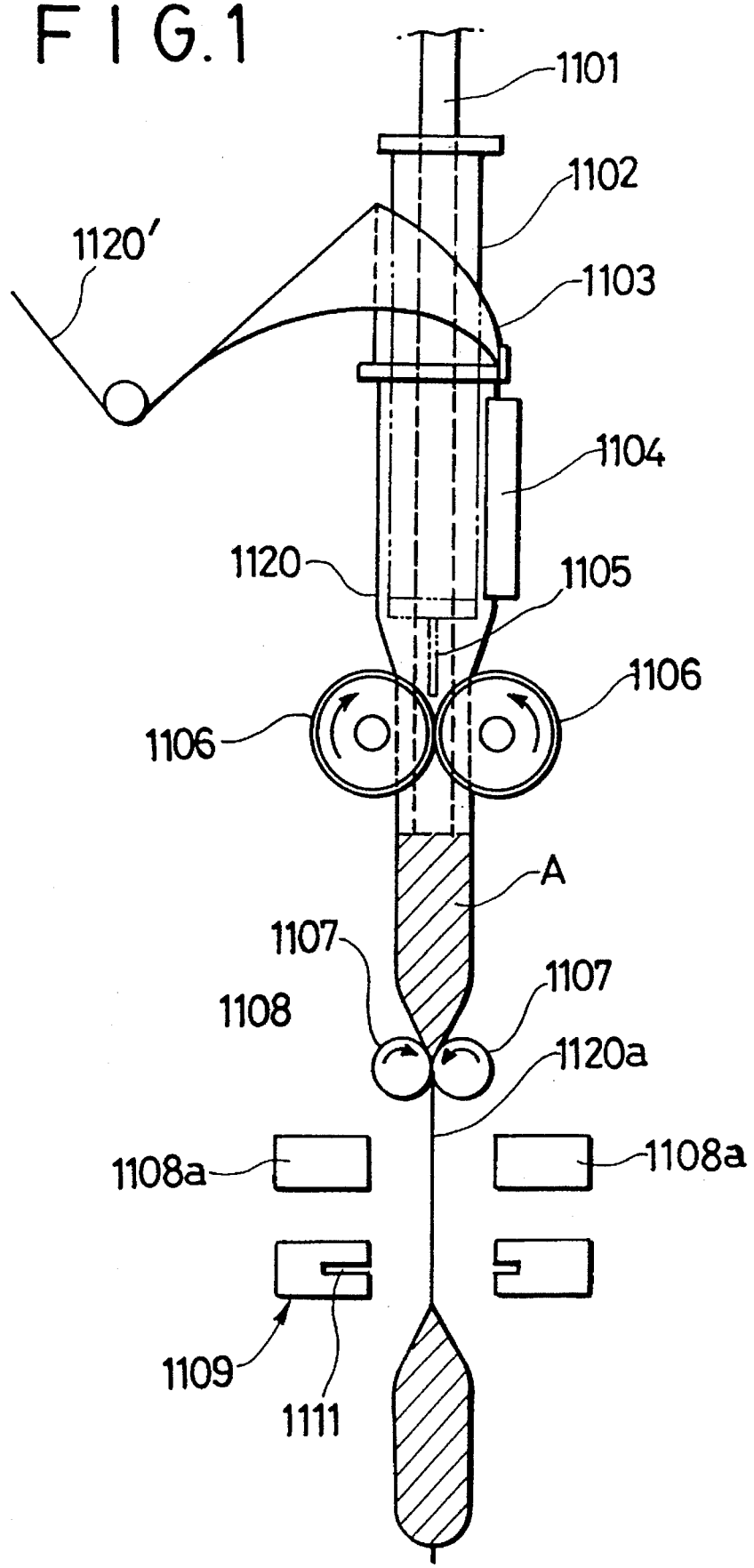
FIG. 1 is a schematic side elevation of a conventional vertical-type filling and packaging machine.
Figure 2:
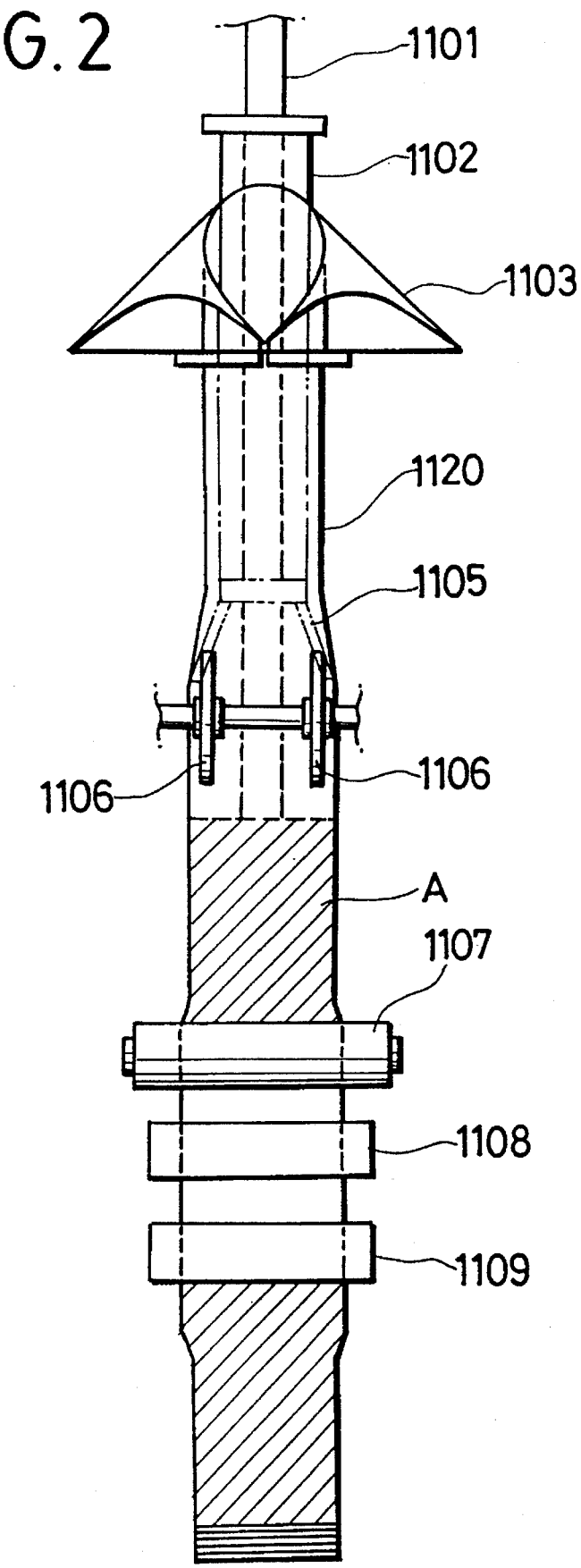
FIG. 2 is a front elevation of the vertical-type filling and packaging machine shown in FIG. 1.
Figure 3:
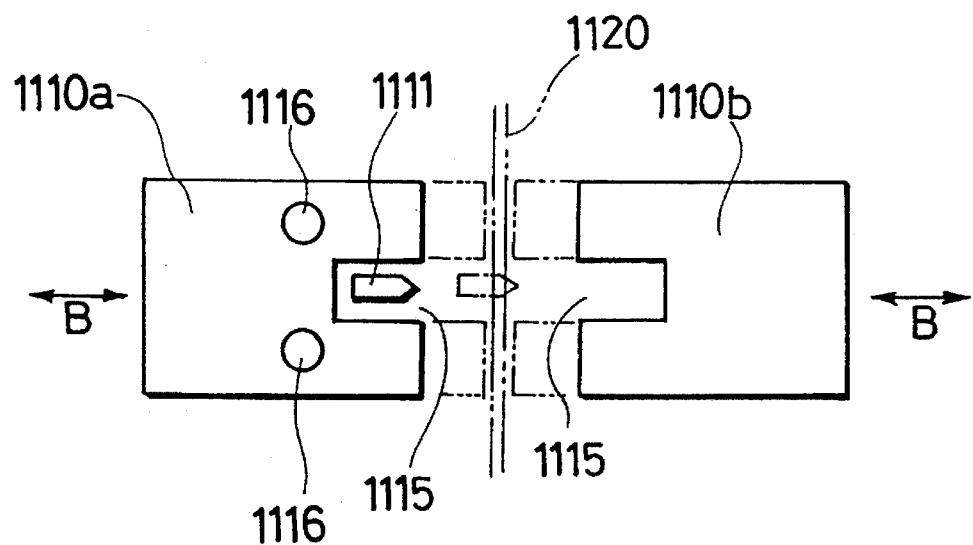
FIG. 3 is an enlarged side elevation of a cutting device of the vertical-type filling and packaging machine shown in FIG. 1.
Figure 4:
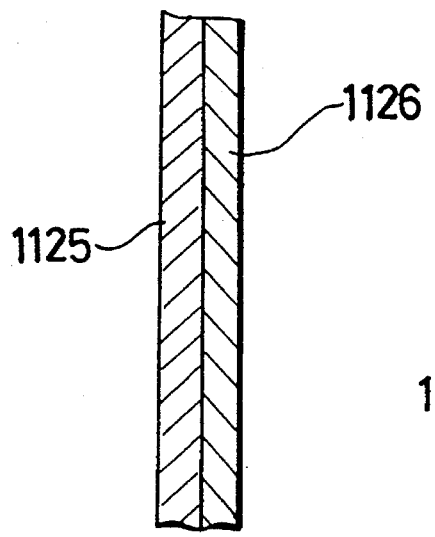
FIG. 4 is an enlarged fragmentary cross-sectional view of a laminated tubular film for packaging a filling material.

As shown in FIG. 6, the vertical-type filling and packaging machine includes a charging nozzle 1, a charging pipe 2, an annular sack forming guide 3, a vertical sealer 4, a spreader guide 5, a pair of film feed rollers 6, a pair of squeezing rollers 7, and tubular film 20. These components of the vertical-type filling and packaging machine are identical structurally and functionally to those shown in FIG. 1, and will not be described in further detail below.

The vertical-type filling and packaging machine also has two vertically spaced upper and lower pairs of film support members 18 disposed below the squeezing rollers 7. The film support members 18 of each pair are positioned in a confronting relationship to each other across the tubular film 20 for clamping and holding the tubular film 20 therebetween. The film support members 18 are movable toward and away from each other in horizontal directions perpendicular to the vertical direction in which the tubular film 20 is fed downwardly. Silicone rubber layers 18a are applied to the respective confronting surfaces of the film support members 18 of each pair for protecting the tubular film 20 from damage when the film support members 18 press closed the tubular film 20.

The vertical-type filling and packaging machine further includes a heat sealing mechanism 10 disposed between the upper and lower pairs of film support members 18. The heat sealing mechanism 10 comprises a horizontal heater bar 11 for horizontally heat-sealing an unfilled region 20a of the tubular film 20 which is formed by the squeezing rollers 7, a horizontal cooling bar 12 for cooling a region heat-sealed by the heater bar 11, a cutter blade 13 positioned between the heater bar 11 and the cooling bar 12 for cutting the heat-sealed portion, and a bearing block 16 disposed in a confronting relationship to the heater bar 11, the cooling bar 12, and the cutting blade 13 across the tubular film 20, the bearing block 16 being movable horizontally and perpendicularly to the vertical direction in which the tubular film 20 is fed downwardly.

The heater bar 11 has a heater (not shown) housed in its distal end facing the tubular film 20, and is angularly movably supported on the upper ends of two parallel joint links 14 that are fixedly mounted on respective rotatable shafts 15. The cooling bar 12 is angularly movably supported on the lower ends of the joint links 14. The heater bar 11 and the cooling bar 12 have their respective distal ends vertically spaced from each other at a-sufficient distance to allow the cutting blade 13 to pass therebetween when the components of the heat sealing mechanism 10 are positioned as shown in FIG. 6.

Figure 7A:
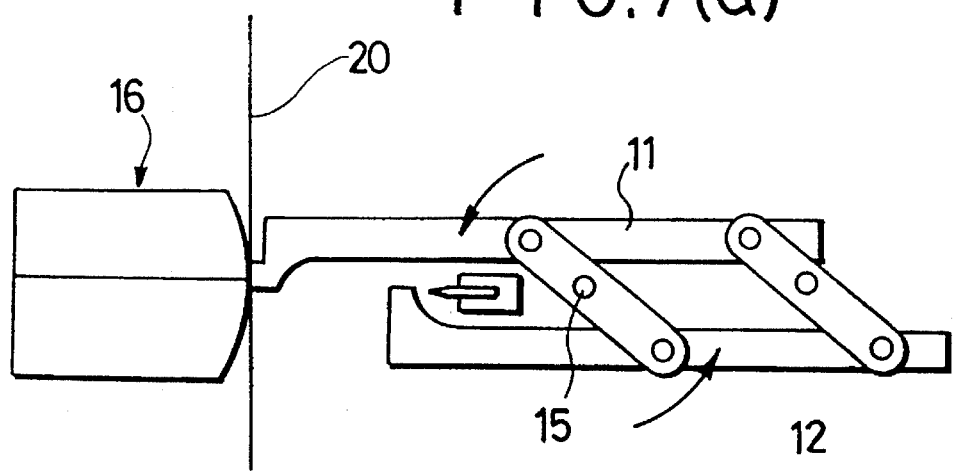
FIG. 7(a) is a side elevation showing the manner in which a tubular film is pressed by a heater bar of the vertical-type filling and packaging machine shown in FIG. 6.
Figure 7B:
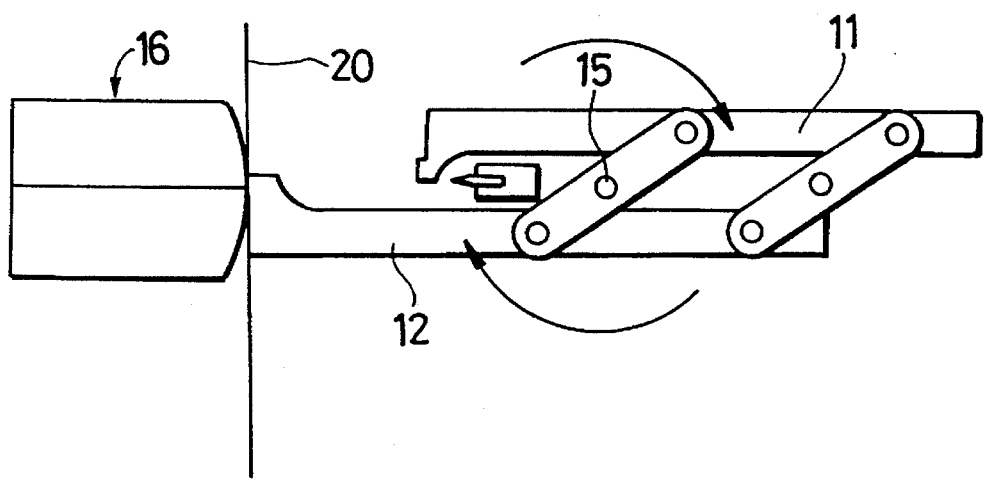
FIG. 7(b) is a side elevation showing the manner in which a tubular film is pressed by a cooling bar of the vertical-type filling and packaging machine shown in FIG. 6.

At least one of the shafts 15 is coupled to a drive source (not shown) so that the shafts 15 can be rotated thereby. When the shafts 15 are rotated counterclockwise (FIG. 6) by the drive source with the bearing block 16 displaced toward the tubular film 20, the cooling bar 12 is retracted away from the tubular film 20 and the heater bar 11 is moved toward the tubular film 20 until the heater bar 11 and the bearing block 16 both press against the tubular film 20, as shown in FIG. 7(a). Conversely, when the shafts 15 are rotated clockwise (FIG. 6) by the drive source, the heater bar 11 is retracted away from the tubular film 20 and the cooling bar 12 is moved toward the tubular film 20 until the cooling bar 12 and the bearing block 16 both press against the tubular film 20, as shown in FIG. 7(b).

The drive source for rotating the shafts 15 may be of any mechanism insofar as it can rotate the shafts 15 reversibly through any desired angle. For example, the drive source may be a stepping motor or a rack-and-pinion mechanism including a pinion fixed to one of the shafts 15 and a rack drivable back and forth by a cylinder and held in mesh with the pinion.

The cutting blade 13 is located vertically between the heater bar 11 and the cooling bar 12 for movement by a cylinder in a horizontal direction perpendicular to the vertical direction in which the tubular film 20 is fed downwardly.

Figure 8:
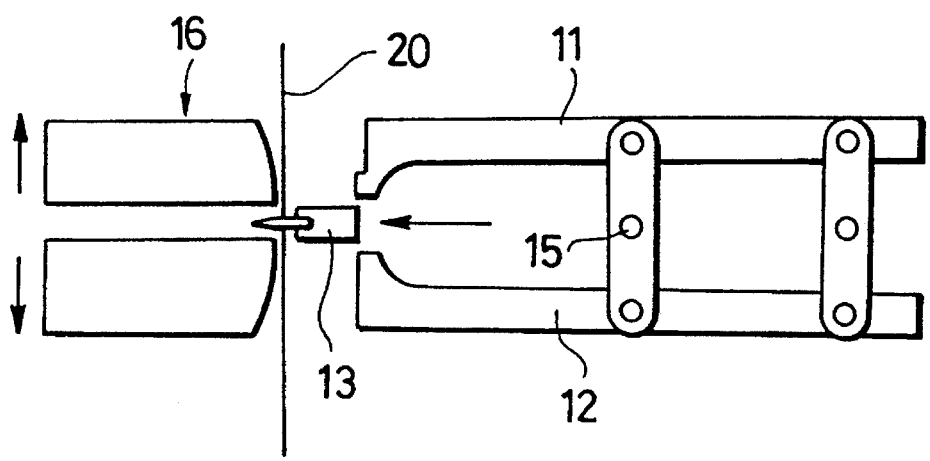
FIG. 8 is a side elevation showing how a cutting blade and a bearing block of the vertical-type filling and packaging machine shown in FIG. 6 operates.

The bearing blocks 16 comprise two members vertically separated from each other along the horizontal direction in which the cutting blade 13 is movable, the members being vertically movable toward and away from each other. When the members of the bearing block 16 are vertically spaced away from each other, creating a gap therebetween for the cutting blade 13 to enter, as shown in FIG. 8, the cutting blade 13 is moved through the tubular film 20 into the gap between the vertically spaced members, thus severing the tubular film 20.

Operation of the vertical-type filling and packaging machine will be described below.

First, when the squeezing rollers 7 and the film support members 18 are opened and the heat sealing mechanism 10 is in its initial position, as shown in FIG. 9(a), the tubular film 20 is filled with a liquid, semi-liquid, or paste-like filling material A. In FIG. 9(a), the lower end of the tubular film 20 has already been heat-sealed and cut off by the heat sealing mechanism 10, and hence has already been closed. Then, as shown in FIG. 9(b), the squeezing rollers 7 are closed, dividing filling material A into a separate mass, following which the film-feed rollers 6 and the squeezing rollers 7 are rotated in the directions indicated by the arrows. As shown in FIG. 9(c), the tubular film 20 is now fed downwardly while being squeezed by the squeezing rollers 7, thereby producing an unfilled region 20a in the tubular film 20.

When the lower end of the unfilled region 20a reaches the lower pair of film support members 18, the film feed rollers 6 and the squeezing rollers 7 are deactivated to stop the downward movement of the tubular film 20, whereupon the film support members 18 are closed, i.e., held against the tubular film 20, as shown in FIG. 9(d). At this time, the unfilled region 20a is supported at two locations above and below the heat sealing mechanism 10.

With the unfilled region 20a being supported by the film support members 18, the bearing block 16 is moved toward the unfilled region 20a, and the shafts 15 are rotated counterclockwise as shown in FIG. 9(e). The heater bar 11 is now moved into contact with the unfilled region 20a, and a portion of the unfilled region 20a which is clamped between the bearing block 16 and the heater bar 11 is pressed and heated, and hence heat-sealed. The unfilled region 20a may be pressed by the heater bar 11 at the same time it is supported by the film support members 18.

Immediately after the unfilled region 20a is heat-sealed, the-shafts 15 are rotated clockwise as shown in FIG. 9(f). The heater bar 11 is retracted from the unfilled region 20a and the cooling bar 11 is moved into contact with the unfilled region 20a. Since the heat of the heat-sealed portion is transferred to the cooling bar 12, the heat-sealed portion is cooled. To accelerate the cooling of the heat-sealed portion by the cooling bar 12, the cooling bar 12 may have a liquid passage (not shown) defined therein, and cooling water may be passed through the liquid passage.

When the heat-sealed portion is cooled, the heater bar 11 and the cooling bar 12 are returned to their initial position as shown in FIG. 9(g). Then, as shown in FIG. 9(h), the bearing block 16 is opened, i.e., the members thereof are moved away from each other, and the cutting blade 13 is moved across the tubular film 20 into the gap between the members of the bearing block 16, thereby severing the heat-sealed portion.

After the heat-sealed portion is cut, the bearing block 16 is closed, the bearing block 16 and the cutting blade 13 are returned to their initial position, and the film support members 18 are opened, as shown in FIG. 9(i). The unfilled region 20a is now released, allowing a sacked product 21 severed at the unfilled region 20a to drop. Thereafter, the squeezing rollers 7 are opened. The above process is repeated to manufacture sacked products 21 successively.

As described above, since the unfilled region 20a is supported at positions above and below the heat-sealed portion by the film support members 18 after the unfilled region 20a is heat-sealed and until it is cut, the heat-sealed portion is not subject to the weight of the filling material A below the heat-sealed portion. As the tubular film 20 is therefore not stretched downwardly by weight of the filling material A before the heat-sealed portion is fully cooled, a single-layer film or thin multilayer film of polyethylene can be used as the tubular film 20.

Inasmuch as the tubular film 20 is heat-sealed, cooled, and severed without being moved, by successively moving the heater bar 11, the cooling bar 12, and the cutting blade 13, the tubular film 20 can be severed at a constant position, and the portion of the tubular film 20 through which the cutting blade 13 will pass to cut the tubular film 20 can be heat-sealed. Therefore, the heat-sealed portion of the tubular film 20 may be reduced in width or vertical extent, with the result that the amount of film used by one sacked product 21 may be reduced, resulting in a savings of material and a reduction in the cost of the sacked product 21. The width or vertical extent of the heat-sealed portion may be about 2 mm, in contrast with conventional width of 20 mm.

Figure 5:
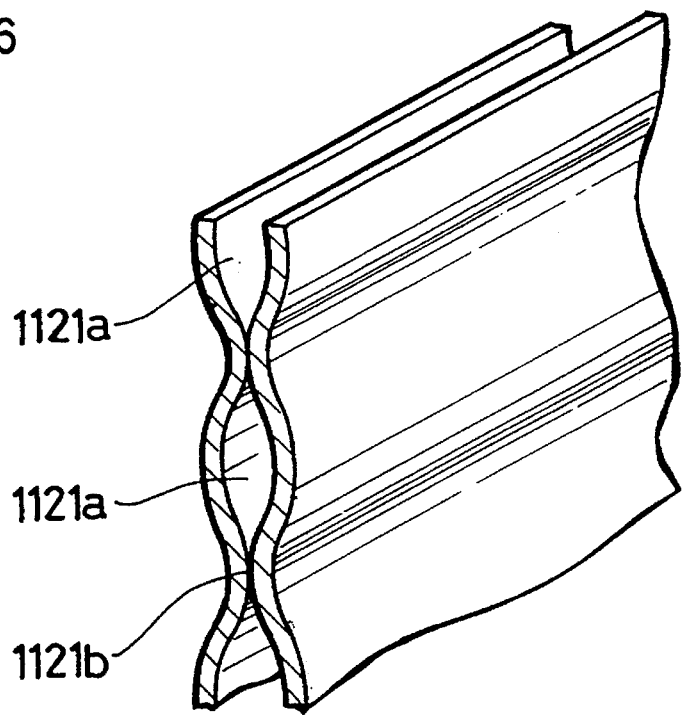
FIG. 5 is an enlarged fragmentary perspective view of a region which is heat-sealed by a heat sealing device of the vertical-type filling and packaging machine shown in FIG. 1.

Because the tubular film 20 is heat-sealed, cooled, and severed without being moved, it is not necessary for the pressing surface of the heater bar 11 to have horizontal ridges for keeping the film layers of the heat-sealed portion bonded to each other after the tubular film 20 is heat-sealed and until it is cooled. As a consequence, the mating surfaces of the film layers of the heat-sealed portion are entirely bonded to each other without any non-bonded areas 1121a as shown in FIG. 5. No filling material A will remain trapped in the heat-sealed portion, and hence leaks through the cut edges of the tubular film 20 and rotting can be prevented.

The filling material A can be filled and packaged at high speed and the filling and packaging machine can be reduced in size because the tubular film 20 is heat-sealed, cooled, and severed in one position without being moved.

In the above embodiment, the heater bar 11 has a built-in heater. However, the filling and packaging machine may employ an impulse sealer comprising a heater bar with a ribbon heater such as a nichrome ribbon mounted on its pressing surface, the ribbon heater being energizable for sealing the tubular film 20.

While the heater bar 11 and the cooling bar 12 are in their initial position when they are positioned as shown in FIG. 6 in the above embodiment, the heater bar 11, the cooling bar 12, and the cutting blade 13 may be consolidated as one unit (not shown) movable toward the bearing block 16, and may be in their initial position when they are positioned as shown in FIG. 7(a). In such a modification, the unit and the bearing block 16 are simultaneously moved toward the tubular film 20 for heat-sealing the tubular film 20, and simultaneously retracted from the tubular film 20 after the tubular film 20 is severed. Stated otherwise, the unit, the bearing block 16, and the film support members 18 operate in timed relationship to each other. Accordingly, the film support members 18 may be combined integrally with the unit and the bearing block 16.

2nd Embodiment

Figure 10:
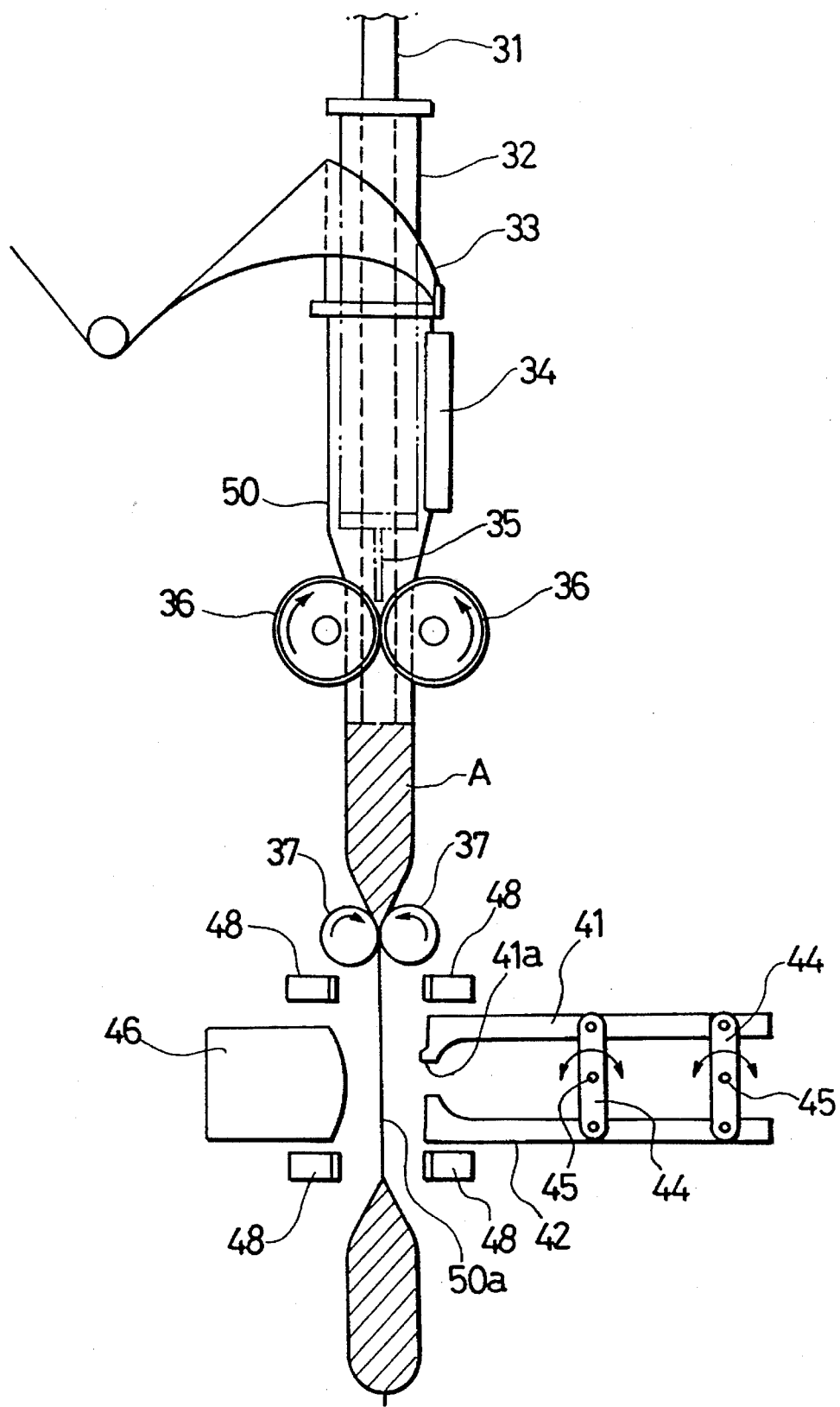
FIG. 10 is a schematic side elevation of a vertical-type filling and packaging machine according to a second embodiment of the present invention.

FIG. 10 shows a vertical-type filling and packaging machine according to a second embodiment of the present invention. According to the second embodiment, as shown in FIG. 10, a heater bar 41 has a triangular protrusion 41a on its pressing surface for simultaneously heat-sealing and severing an unfilled region 50a when the heater bar 41 is pressed against the unfilled region 50a. Therefore, the vertical-type filling and packaging machine according to the second embodiment has no independent cutting blade and has a bearing block 46 which is not spaced vertically. The vertical-type filling and packaging machine according to the second embodiment also includes a charging nozzle 31, a charging pipe 32, an annular sack forming guide 33, a vertical sealer 34, a spreader guide 35, a pair of film feed rollers 36, a pair of squeezing rollers 47, two pairs of film support members 48, a cooling bar 42, a pair of rotatable shafts 45, and a pair of joint links 44. These components are identical structurally and functionally to those shown in FIG. 6, and will not be described in further detail below.

The vertical-type filling and packaging machine according to the second embodiment operates as follows: In the second embodiment, the vertical-type filling and packaging machine operates in the same manner as the vertical-type filling and packaging machine according to the first embodiment until an unfilled region 50a is created in a tubular film 50 by the squeezing rollers 37 and supported by the film support members 48. Therefore, only the operation subsequent to the supporting of the unfilled region 50a by the film support members 48 will be described below.

After the unfilled region 50a has been supported by the film support members 48, the bearing block 46 is moved toward the unfilled region 50a, and the shafts 45 are rotated counterclockwise (FIG. 10) to move the heater bar 41 toward the unfilled region 50a. The portion of the unfilled region 50a which is clamped between the bearing block 46 and the heater bar 41 is pressed, heat-sealed, and severed at the same time. Immediately after the unfilled region 50a is heat-sealed, the shafts 45 are rotated clockwise to bring the cooling bar 42 into pressing engagement with the heat-sealed portion to thereby cool the heat-sealed portion. Thereafter, the heater bar 41, the cooling bar 42, and the bearing block 46 are returned to their initial position as shown in FIG. 10, and the film support members 48 are then opened, whereupon a sacked product which is filled with the filling material A and heat-sealed is produced.

Since the pressing surface of the heater bar 41 has the triangular protrusion 41a, the unfilled region 50a can be heat-sealed and severed simultaneously by pressing the heater bar 41 against the unfilled region 50a. As a result, the process of manufacturing the sacked product by charging the filling material A into the tubular film 50 is simplified and may be speeded up. The vertical-type filling and packaging machine according to the second embodiment may be reduced in size as it has a relatively simple structure.

In the above embodiments, the heater bar and the cooling bar are movable in ganged relationship to the joint links. However, the joint links may be dispensed with, and the heater bar and the cooling bar may be actuated by respective drive sources independent of each other. The heater bar and the cooling bar may be relatively positioned in an arrangement other than the arrangement according to the above embodiments. For example, the cooling bar may be positioned above the heater bar, or the heater bar may be positioned below the cooling bar. While the film support members are positioned above and below the heat sealing mechanism in the above embodiments, they may be situated only below the heat sealing mechanism. However, the unfilled region of the tubular film should preferably be supported by the film support members above and below the heat sealing mechanism because the unfilled region can reliably be held in position.

3rd Embodiment

Figure 11:
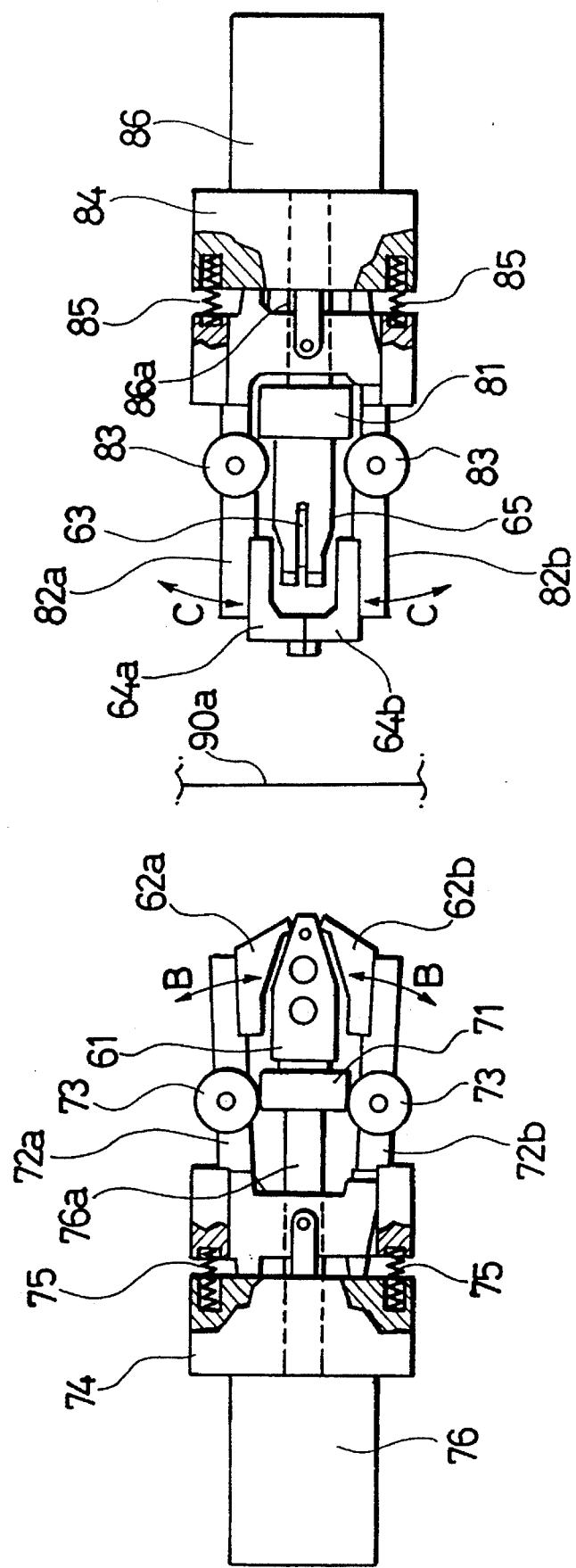
FIG. 11 is a side elevation, partly in cross section, of a heat sealing mechanism of a vertical-type filling and packaging machine according to a third embodiment of the present invention.

FIG. 11 shows a heat sealing mechanism of a vertical-type filling and packaging machine according to a third embodiment of the present invention. Except for the heat sealing mechanism, the components of the vertical-type filling and packaging machine according to the third embodiment are the same as the corresponding components of the vertical-type filling and packaging machine according to the first embodiment. Therefore, only the heat sealing mechanism will be described in detail below.

As shown in FIG. 11, the heat sealing mechanism has two sliders 74, 84 disposed one on each side of an unfilled region 90a which is produced in a tubular film by a pair of squeezing rollers (not shown). The sliders 74, 84 are movable by respective cylinders (not shown) in a horizontal direction perpendicular to the vertical direction in which the tubular film is fed downwardly.

Two cooling bar support members 72a, 72b are mounted on the slider 74 for angular movement in the directions indicated by the arrows B. Cooling bars 62a, 62b are fixed to respective distal ends of the cooling bar support members 72a, 72b, and positioned such that even when they are closest to each other, they define a gap therebetween which is wide enough to permit a cutting blade 63 (described below) to pass therethrough. Coil springs 75 are disposed between the slider 74 and the respective cooling bar support members 72a, 72b for normally urging the cooling bar support members 72a, 72b in the closing direction, i.e., the coil springs 75 move the cooling bars 62a, 62b toward each other.

On the slider 74, there is mounted a heater bar actuating cylinder 76 for moving a heater bar 61 in a direction parallel to the direction in which the slider 74 is movable. The heater bar actuating cylinder 76 has a rod 76a disposed for back and forth movement between the cooling bar support members 72a, 72b, the heater bar 61 being fixed to the distal end of the rod 76a. The rod 76a supports thereon a cam 71 for actuating the cooling bars 62a, 62b. When the heater bar actuating cylinder 76 is operated to project the rod 76a, the cam 71 engages cam follower rollers 73 rotatably mounted on the respective cooling bar support members 72a, 72b, thus spreading, i.e., moving, the cooling bars 62a, 62b away from each other. At this time, the distal end of the heater bar 61 projects beyond the cooling bars 62a, 62b.

Two heater bar receiver support members 82a, 82b are mounted on the slider 84 for angular movement in the directions indicated by the arrows C. Heater bar receivers 64a, 64b with silicone rubber layers applied respectively to the distal ends thereof are fixed to respective distal ends of the heater bar receiver support members 82a, 82b. Coil springs 85 are disposed between the slider 84 and the respective heater bar receiver support members 82a, 82b for normally urging the heater bar receiver support members 82a, 82b in the direction to close, i.e., the coil springs 85 move the heater bar receivers 64a, 64b toward each other.

On the slider 84, there is mounted a cutting device actuating cylinder 86 for moving a cutting device 65 in a direction parallel to the direction in which the slider 84 is movable. The cutting device 65, with a silicone rubber layer applied to its distal end, has a cutting blade 63 which can project therefrom. The cutting device actuating cylinder 86 has a rod 86a disposed for back and forth movement between the heater bar receiver support members 82a, 82b, and the cutting device 65 is fixed to the distal end of the rod 86a. The rod 86a supports thereon a cam 81 for actuating the heater bar receivers 64a, 64b. When the cutting device actuating cylinder 86 is operated to project the rod 86a, the cam 81 engages cam follower rollers 83 rotatably mounted on the respective heater bar receiver support members 82a, 82b, thus spreading, i.e., moving, the heater bar receivers 64a, 64b away from each other. At this time, the distal end of the cutting device 65 projects beyond the heater bar receivers 64a, 64b.

Operation of the heat sealing mechanism shown in FIG. 11 will be described below with reference to FIGS. 12 and 13.

Figure 12:
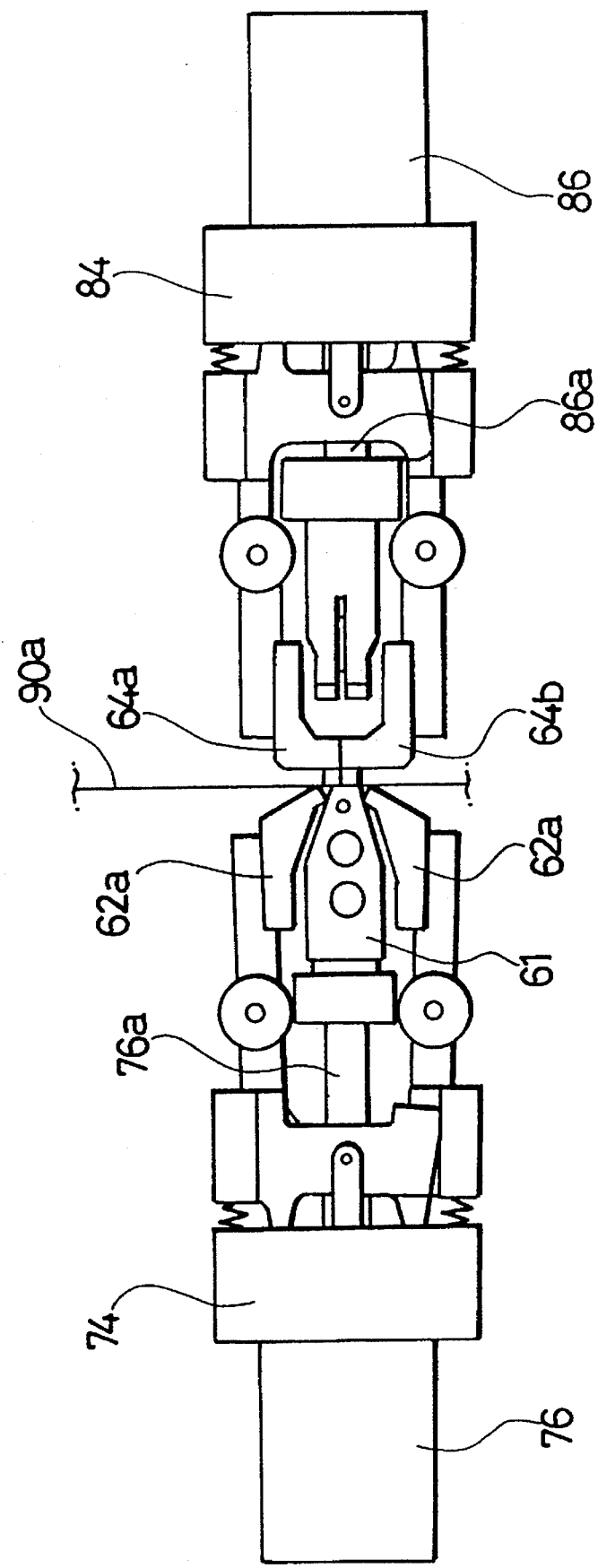
FIG. 12 is a side elevation showing the manner in which the heat sealing mechanism shown in FIG. 11 operates to heat-seal a tubular film.

First, as shown in FIG. 12, with the heater bar actuating cylinder 76 operated to extend the rod 76a and the cutting device actuating cylinder 86 operated to retract the rod 86a, the sliders 74, 84 are moved toward each other. Since the cooling bars 62a, 62b are open with the heater bar 61 projecting therebetween, the unfilled region 90a is clamped between the heater bar 61 and the heater bar receivers 64a, 64b and heat-sealed. At this time, the unfilled region 90a is supported by film support members (not shown) which are identical to those shown in FIG. 6. The film support members may be integral with the sliders 74, 84, and may support the unfilled region 90a upon movement of the sliders 74, 84.

Figure 13:
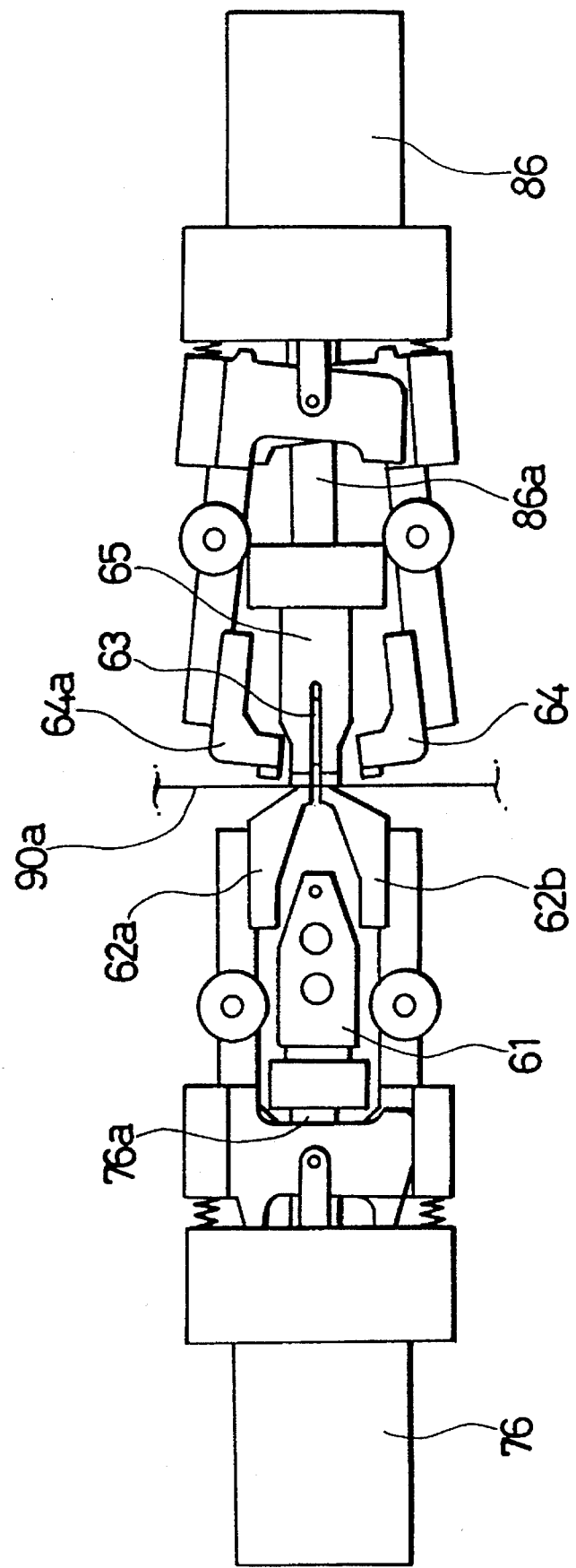
FIG. 13 is a side elevation view showing the manner in which the heat sealing mechanism shown in FIG. 11 operates to cool and cut the heat-sealed tubular film.

Upon completion of the heat-sealing of the unfilled region 90a, the heater bar actuating cylinder 76 is operated to retract the rod 76a and the cutting device actuating cylinder 86 is operated to extend the rod 86a, as shown in FIG. 13. The heater bar 61 is retracted to close the cooling bars 62a, 62b, and the cutting device 65 is moved toward the unfilled region 90a to open the heater bar receivers 674a, 64b, whereupon the unfilled region 90a is clamped between the cooling bars 62a, 62b and the cutting device 65. The heat-sealed portion is now cooled, and the cutting blade 63 is projected to sever the heat-sealed portion.

As described above, the heater bar 61 can project from between the two cooling bars 62a, 62b that are able to vertically open and close, and the cutting device 65 can project from between the two heater bar receivers 64a, 64b that are able to vertically open and close. Consequently, the unfilled region 90a can be heat-sealed, cooled, and severed by the heater bar 61, the cooling bars 62a, 62b, and the cutting device 65 without moving the tubular film.

In this embodiment, the heat-sealed portion is cut by the cutting blade 63. However, the heater bar 61 may have a triangular protrusion on the distal end thereof, as in the second embodiment, and the cutting device 65 may be replaced with a bearing member, so that the unfilled region 90a can be heat-sealed and severed simultaneously by the heater bar 61 and the bearing member.

Figure 14:
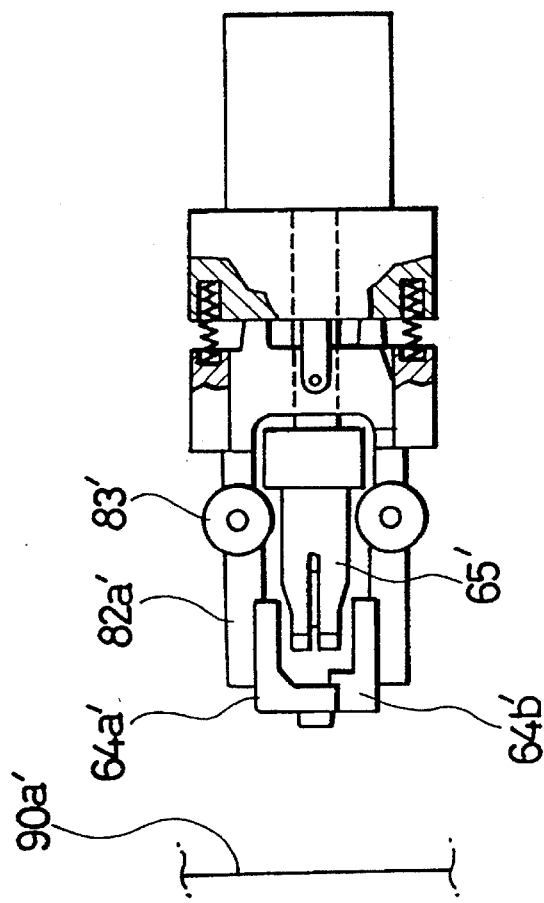
FIG. 14 is a side elevation, partly in cross section, of modified heater bar receivers for the heat sealing mechanism shown in FIG. 11.

FIG. 14 shows a modification of the heater bar receivers of the heat sealing mechanism shown in FIG. 11. In FIG. 14, a heater bar receiver 64a' is larger in size than a heater bar receiver 64b' such that the mating surfaces of these heater bar receivers 64a', 64b' are positioned out of alignment with a heater bar 61', and the heater bar receiver 64a' is positioned in a confronting relationship to the heater bar 61'. A silicone rubber layer is applied to the distal end of the heater bar receiver 64a'. Since the heater bar 61' faces only the heater bar receiver 64a', an unfilled region 90a' of a tubular film can be uniformly pressed and hence be heat-sealed reliably by the heater bar 61' and the heater bar receiver 64a'. With this modification, a cutting device 65', when projected, tends to hit the heater bar receiver 64a' unless the heater bar receiver 64a' is opened to a greater extent than the other heater bar receiver 64b'. Therefore, a cam follower roller 83' rotatably mounted on a heater bar receiver support member 82a' to which the heater bar receiver 64a' is fixed is larger in diameter than the corresponding cam follower roller shown in FIG. 11.

4th Embodiment

Figure 15:
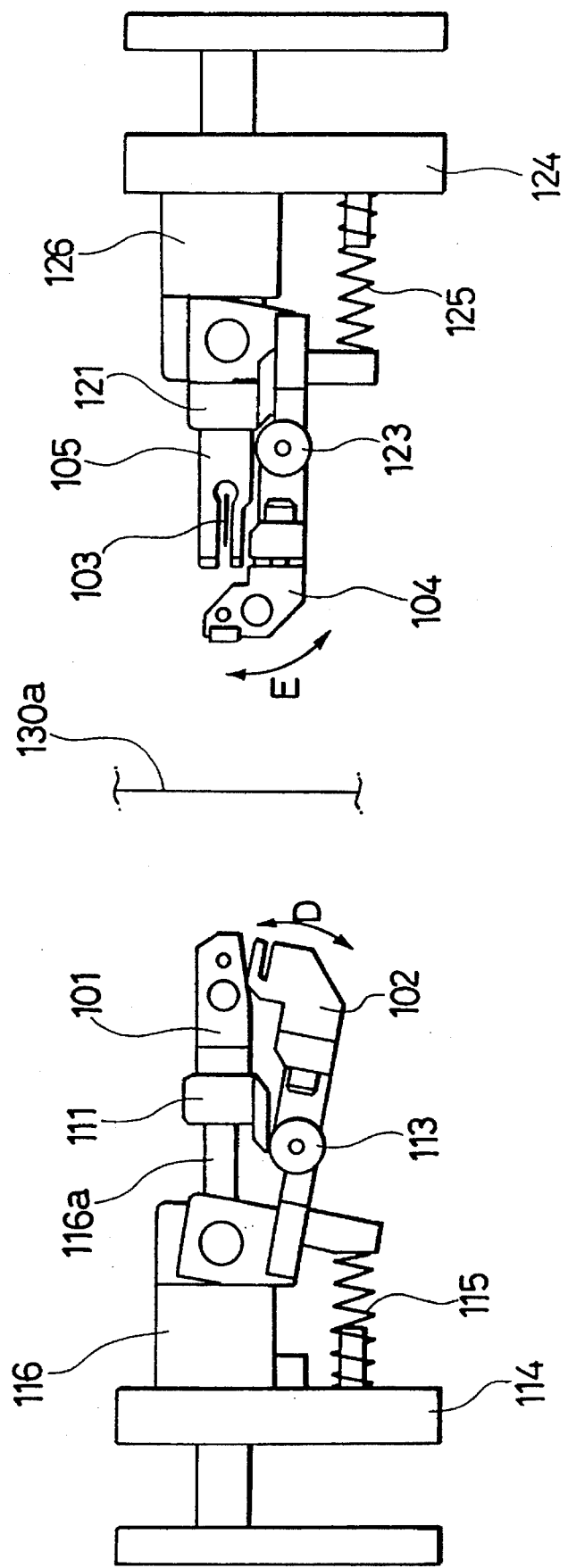
FIG. 15 is a side elevation of a heat sealing mechanism of a vertical-type filling and packaging machine according to a fourth embodiment of the present invention.

FIG. 15 shows a heat sealing mechanism of a vertical-type filling and packaging machine according to a fourth embodiment of the present invention. Since the components other than the heat sealing mechanism of the vertical-type filling and packaging machine according to the fourth embodiment are identical to those of the vertical-type filling and packaging machine according to the first embodiment, only the heat sealing mechanism will be described in detail below.

As shown in FIG. 15, the heat sealing mechanism has two sliders 114, 124 disposed one on each side of an unfilled region 130a which is produced in a tubular film by a pair of squeezing rollers (not shown). The sliders 114, 124 are movable by respective cylinders (not shown) in a horizontal direction perpendicular to the vertical direction in which the tubular film is fed downwardly.

On the slider 114, there is mounted a heater bar actuating cylinder 116 having a rod 116a movable in a direction parallel to the direction in which the slider 114 is movable. A heater bar 101 is fixed to the distal end of the rod 116a. A cooling bar 102 is mounted on the heater bar actuating cylinder 116 for angular movement in the directions indicated by the arrow D. The cooling bar 102 has a groove defined in the distal end thereof for receiving a cutting blade 103 (described hereinafter). A coil spring 115 is disposed between the slider 114 and the cooling bar 102 for normally urging the cooling bar 102 to turn counterclockwise. The distal end of the cooling bar 102 is restricted so as not to turn upwardly beyond a position aligned with a cutting device 105 (described hereinafter). The rod 116a supports thereon a cam 111 for actuating the cooling bar 102, and the cooling bar 102 supports thereon a cam follower roller 113 that is engageable by the cam 111 when the rod 116a is projected. When the heater bar actuating cylinder 116 is operated to project the rod 116a, the cam 111 engages the cam follower roller 113, forcibly turning the cooling bar 102 clockwise against the bias of the coil spring 115.

On the slider 124, there is mounted a cutting device actuating cylinder 126 having a rod 126a (see FIG. 17) movable back and forth in a direction parallel to the direction in which the slider 124 is movable. The cutting device 105 has a silicone rubber layer applied to its distal end, and has a cutting blade 103 which can project therefrom. A heater bar receiver 104 with a silicone rubber layer applied to its distal end is mounted on the cutting device actuating cylinder 126 for angular movement in the directions indicated by the arrow E. A coil spring 125 is disposed between the slider 124 and the heater bar receiver 104 for normally urging the heater bar receiver 104 to turn clockwise. The distal end of the heater bar receiver 104 is restricted so as not to turn upwardly beyond a position aligned with the heater bar 101. The rod 126a supports thereon a cam 121 for actuating the heater bar receiver 104, and the heater-bar receiver 104 supports thereon a cam follower roller 123 that is engageable by the cam 121 when the rod 126a is projected. When the cutting device actuating cylinder 126 is operated to project the rod 126a, the cam 121 engages the cam follower roller 123, forcibly turning the heater bar receiver 104 counterclockwise against the bias of the coil spring 125.

Operation of the heat sealing mechanism shown in FIG. 15 will be described below with reference to FIGS. 16 and 17.

Figure 16:
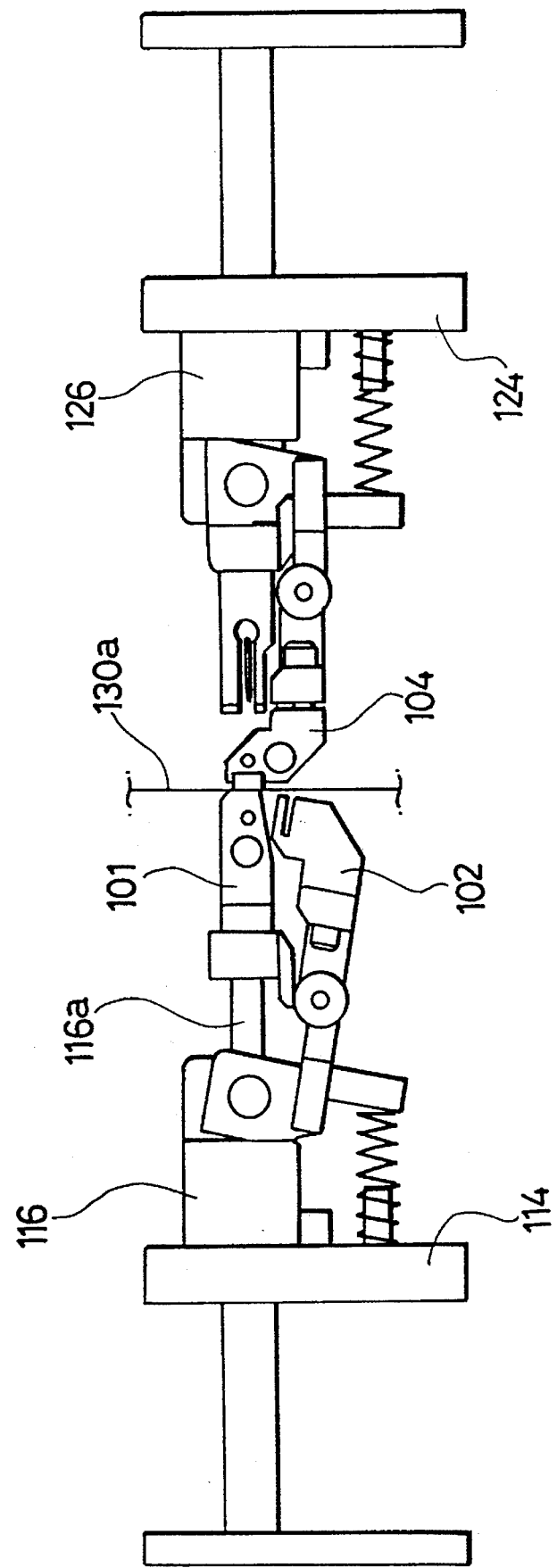
FIG. 16 is a side elevation showing the manner in which the heat sealing mechanism shown in FIG. 16 operates to heat-seal a tubular film.

First, as shown in FIG. 16, with the heater bar actuating cylinder 116 operated to extend the rod 116a and the cutting device actuating cylinder 126 operated to retract the rod 126a (see FIG. 17), the sliders 114, 124 are moved toward each other. Since the heater bar 101 is projected and the cooling bar 102 is turned clockwise upon extension of the rod 116a, the unfilled region 130a is clamped between the heater bar 101 and the heater bar receiver 104 and heat-sealed. At this time, the unfilled region 130a is supported by film support members (not shown) which are identical to those shown in FIG. 6. The film support members may be integral with the sliders 114, 124, and may support the unfilled region 130a upon movement of the sliders 114, 24.

Figure 17:
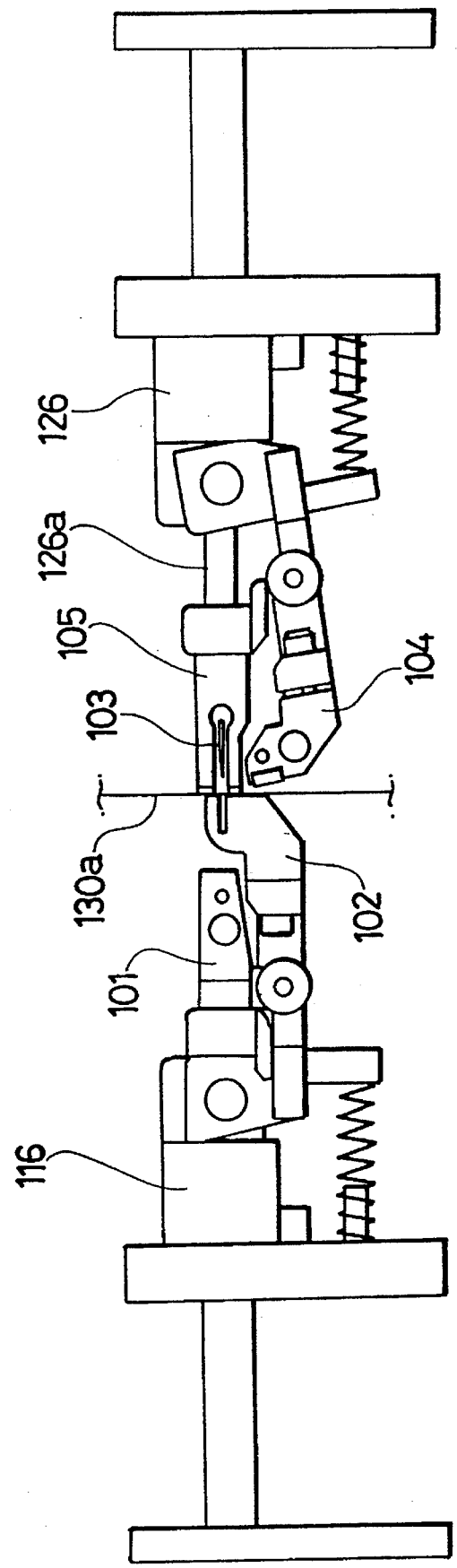
FIG. 17 is a side elevation showing the manner in which the heat sealing mechanism shown in FIG. 15 operates to cool and cut the heat-sealed tubular film.

When the heat-sealing of the unfilled region 130a is completed, the heater bar actuating cylinder 116 is operated to retract the rod 116a and the cutting device actuating cylinder 126 is operated to extend the rod 126a, as shown in FIG. 17. The heater bar 101 is retracted to turn the cooling bar 102a upwardly into a position substantially aligned with the cutting device 105, the cutting device 105 is moved toward the unfilled region 130a, and the heater bar receiver 104 is turned counterclockwise. The unfilled region 130a is now clamped between the cooling bar 102 and the cutting device 105. The heat-sealed portion is now cooled, and the cutting blade 103 is projected to sever the heat-sealed portion.

As described above, the heater bar 101 and the cutting device 105 are positioned in a confronting relationship to each other. The cooling bar 102 is angularly movable into alignment with the cutting device 105 when the heater bar 101 is retracted, and the heater bar receiver 104 is angularly movable into alignment with the heat bar 101 when the cutting device 105 is retracted. The heat sealing mechanism of such an arrangement is simpler in structure than the heat sealing mechanism according to the third embodiment. Therefore, the heat sealing mechanism and hence the filling and packaging machine according to the fourth embodiment may be reduced in size.

In the fourth embodiment, the heat-sealed portion is cut by the cutting blade 103. However, the heater bar 101 may have a triangular protrusion on the distal end thereof, as in the second embodiment, and the cutting device 105 may be replaced with a bearing member so that the unfilled region 130a can be heat-sealed and severed simultaneously by the heater bar 101 and the bearing member.

As described above, the vertical-type filling and packaging machine according to the present invention has a heater bar for pressing and heat-sealing an unfilled region in a tubular film when the tubular film is held at rest, a cooling bar for pressing and cooling a heat-sealed portion of the tubular film, cutting means for cutting the heat-sealed portion, and film support members for holding the unfilled region in position. Therefore, the unfilled region can be heat-sealed, cooled, and severed without moving the tubular film while the unfilled region is being supported. The vertical-type filling and packaging machine according to the present invention offers the following advantages:

(1) Since the heat-sealed portion is not subject to the weight of the filling material beneath the heat-sealed portion, the tubular film is not unduly stretched. The tubular film is not limited to any particular type, but may be a single-layer film or a thin multilayer film.

(2) The pressing surface of the heater bar is not required to have horizontal ridges for holding the film layers of the heat-sealed portion bonded to each other. Consequently, the tubular film can be heat-sealed in its entirety in the heat-sealed portion. As a result, no filling material remains trapped in the heat-sealed portion, and hence leaks through the cut edges of the tubular film and consequent rotting can be prevented.

(3) Inasmuch as the tubular film can be severed at a constant position and the tubular film can be heat-sealed in its entirety in the heat-sealed portion as described above in (2), the heat-sealed portion may be reduced in width or vertical extent. Thus, the amount of film used by one sacked product may be reduced. Since any force exerted by the heater bar is applied uniformly to the heat-sealed surfaces, breakdowns in the operation of the filling and packaging machine can be prevented that would otherwise be caused by melting of the tubular film due to the heat produced by the heater bar or rupture of the tubular film owing to physical contact with the heater bar.

(4) The unfilled region can be heat-sealed at high speed, and the filling and packaging machine may be reduced in size.

With the heater bar having a triangular protrusion on its pressing surface, the unfilled region can be heat-sealed and severed simultaneously by the heater bar. Such a modification is effective in simplifying the heat-sealing operation and also in simplifying the structure of the filling and packaging machine.

Although certain preferred embodiments of the present invention have been shown and described in detail, it should be understood that various changes and modifications may be made therein without departing from the scope of the appended claims.

What is claimed is:

1. A vertical-type filling and packaging machine comprising:

a pair of squeezing rollers rotatably disposed one on each side of a tubular film of resin filled with a filling material for clamping and feeding the tubular film downwardly to create an unfilled region in the tubular film;

a heat sealing mechanism disposed downwardly of said squeezing rollers for heat-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion; and first and second film support members, respectively disposed above and below said heat sealing mechanism and respectively including means for gripping and holding an upper end and a lower end of said unfilled region from the time the unfilled region is heat-sealed until the unfilled region is severed by said heat sealing mechanism.

2. A vertical-type filling and packaging machine according to claim 1, wherein said filling material comprises a fluid material.

3. A vertical-type filling and packaging machine according to claim 1 or claim 2, wherein said heater bar and said cutting means are disposed one on each side of said unfilled region for movement toward and away from the unfilled region, said cooling bar comprising two members movable vertically away from each other upon movement of said heater bar toward said unfilled region for allowing said heater bar to project from between said two members, said heat sealing mechanism further comprising two heater bar receivers disposed in a confronting relationship to said heater bar across said unfilled region and movable vertically away from each other upon movement of said cutting means toward said unfilled region for allowing said cutting means to project from between said two heater bar receivers.

4. A vertical-type filling and packaging machine according to claim 3, wherein said cutting means comprises a cutting blade movable toward and away from said unfilled region.

5. A vertical-type filling and packaging machine according to claim 2, wherein said heater bar comprises a triangular protrusion disposed on a pressing surface of said heater bar which is to be pressed against said unfilled region, and further wherein a bearing member is provided against which said triangular protrusion is urged to thereby provide said cutting means which cut said unfilled region between said triangular protrusion and said bearing member.

6. A vertical-type filling and packaging machine according to claim 1 or claim 2, wherein said heat sealing mechanism comprises a pair of parallel joint links pivotally supported at respective central portions thereof, said heater bar being angularly movably mounted on respective ends of said joint links, and said cooling bar being angularly movably mounted on respective opposite ends of said joint links.

7. A vertical-type filling and packaging machine according to claim 6, wherein said cutting means comprises a cutting blade disposed between said heater bar and said cooling bar for movement toward said heat-sealed portion.

8. A vertical-type filling and packaging machine according to claim 6, wherein said cutting means comprises a triangular protrusion disposed on a pressing surface of said heater bar which is to be pressed against said unfilled region.

9. A vertical-type filling and packaging machine according to claim 1, wherein said heater bar comprises a triangular protrusion disposed on a pressing surface of said heater bar which is to be pressed against said unfilled region, and further wherein a bearing member is provided against which said triangular protrusion is urged to thereby provide said cutting means which cut said unfilled region between said triangular protrusion and said bearing member.

10. A vertical-type filling and packaging machine according to claim 1 or claim 2, wherein said heater bar and said cutting means are disposed one on each side of said unfilled region for movement toward and away from the unfilled region, said cooling bar being movable to a position confronting said cutting means upon movement of said heater bar away from said unfilled region, and said heat sealing mechanism further comprising a heater bar receiver movable to a position confronting said heater bar upon movement of said cutting means away from said unfilled region.

11. A vertical-type filling and packaging machine according to claim 10, wherein said cutting means comprises a cutting blade movable toward and away from said unfilled region.

12. The vertical-type filling and packaging machine according to claim 1, further including a bearing member including upper and lower bearing member parts, and wherein at least one of said upper and lower bearing member parts is movable to thereby provide a bearing member spaced condition in which said upper and lower bearing member parts are vertically spaced from one another, and a bearing member non-spaced condition in which said upper and lower bearing member parts are adjacent to one another, and wherein said cutting means severs said heat-sealed portion when said bearing member is in said bearing member spaced condition, with said cutting means severing said heat-sealed portion in a space between said upper and lower bearing member parts.

13. A vertical-type filling and packaging machine according to claim 1, further including at least one cooling bar bearing member and at least one heater bar bearing member, wherein said heater bar presses said unfilled region against said heater bar bearing member, and said cooling bar presses said unfilled region against said cooling bar bearing member, and further wherein each of said heater bar, said cooling bar, said heater bar bearing member and said cooling bar bearing member includes one of a cam and cam follower, such that as said heater bar and heater bar bearing member move toward one another relative pivoting movement is provided with respect to said cooling bar and cooling bar bearing member.

14. The vertical-type filling and packaging machine according to claim 13, further including a cutting blade disposed in said cooling bar bearing member.

15. The vertical-type filling and packaging machine of claim 13, wherein when said cooling bar and said cooling bar bearing member are spaced from said unfilled region said cooling bar and said cooling bar bearing member are diagonally disposed with respect to one another, with one of said cooling bar and said cooling bar bearing member at a height above the other of said cooling bar and said cooling bar bearing member.

16. A vertical-type filling and packaging machine comprising:

a pair of squeezing rollers rotatably disposed one on each side of a tubular film of resin filled with a filling material for clamping and feeding the tubular film downwardly to create an unfilled region in the tubular film;

a heat sealing mechanism disposed downwardly of said squeezing rollers for heat-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion; and film support members, disposed downwardly of said heat sealing mechanism for gripping and holding a lower end of said unfilled region from the time the unfilled region is heat-sealed until the unfilled region is severed by said heat sealing mechanism; and a bearing member including upper and lower bearing member parts, and wherein at least one of said upper and lower bearing member parts is movable to thereby provide a bearing member spaced condition in which said upper and lower bearing member parts are vertically spaced from one another, and a bearing member non-spaced condition in which said upper and lower bearing member parts are adjacent to one another, and wherein said cutting means severs said heat-sealed portion when said upper and lower bearing member parts are in said bearing member spaced condition, with said cutting means severing said heat-sealed portion in a space between said upper and lower bearing member parts.

17. A vertical-type filling and packaging machine comprising:

a pair of squeezing rollers rotatably disposed one on each side of a tubular film of resin filled with a filling material for clamping and feeding the tubular film downwardly to create an unfilled region in the tubular film;

a heat sealing mechanism disposed downwardly of said squeezing rollers for heat-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion;

film support members, disposed downwardly of said heat sealing mechanism for gripping and holding a lower end of said unfilled region from the time the unfilled region is heat-sealed until the unfilled region is severed by said heat sealing mechanism; and at least one cooling bar bearing member and at least one heater bar bearing member, wherein said heater bar presses said unfilled region against said heater bar bearing member, and said cooling bar presses said unfilled region against said cooling bar bearing member, and further wherein each of said heater bar, said cooling bar, said heater bar bearing member and said cooling bar bearing member includes one of a cam and cam follower, such that as said heater bar and heater bar bearing member move toward one another relative pivoting movement is provided with respect to said cooling bar and cooling bar bearing member.

18. A vertical-type filling and packaging machine comprising:

a pair of squeezing rollers rotatably disposed one on each side of a tubular film of resin filled with a filling material for clamping and feeding the tubular film downwardly to create an unfilled region in the tubular film;

a heat sealing mechanism disposed downwardly of said squeezing rollers for heat-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion; and film support members disposed downwardly of said heat sealing mechanism for gripping and holding a lower end of said unfilled region from the time the unfilled region is heat-sealed until the unfilled region is severed by said heat sealing mechanism;

said cooling bar comprising two members movable vertically away from each other upon movement of said heater bar toward said unfilled region for allowing said heater bar to project from between said two members.

19. A vertical-type filling and packaging machine comprising:

a pair of squeezing rollers rotatably disposed one on each side of a tubular film of resin filled with a filling material for clamping and feeding the tubular film downwardly to create an unfilled region in the tubular film;

a heat sealing mechanism disposed downwardly of said squeezing rollers for heat-sealing and severing the unfilled region, said heat sealing mechanism comprising a heater bar for heat-sealing the unfilled region, a cooling bar for cooling a heat-sealed portion which is heat-sealed by said heater bar, said heater bar and said cooling bar being successively pressable against a portion of said unfilled region while said tubular film is being held at rest, and cutting means for severing said heat-sealed portion; and film support members, disposed downwardly of said heat sealing mechanism for gripping and holding a lower end of said unfilled region from the time the unfilled region is heat-sealed until the unfilled region is severed by said heat sealing mechanism;

said heat sealing mechanism including a pair of parallel joint links pivotally supported at respective central portions thereof, said heater bar being angularly movably mounted on respective ends of said joint links, and said cooling bar being angularly movably mounted on respective opposite ends of said joint links.

* * * * *